United States Patent [19]

Boyles et al.

[11] E Re. 28,985

[45] Reissued Sept. 28, 1976

[54] ALARM CLOCK TIMER WITH MANUALLY OPERABLE RESET MECHANISM

[75] Inventors: Robert L. Boyles, Wayland; Samuel Polonsky, Medway, both of Mass.

[73] Assignee: General Electric Company, Bridgeport, Conn.

[22] Filed: Nov. 24, 1975

[21] Appl. No.: 634,893

Related U.S. Patent Documents

Reissue of:

[64] Patent No.: 3,740,502
Issued: June 19, 1973
Appl. No.: 241,963
Filed: Apr. 7, 1972

[52] U.S. Cl. ..... 200/38 FA; 58/19 R; 58/20; 58/22; 200/35 A; 200/38 R

[51] Int. Cl.[2] ..... H01H 43/04

[58] Field of Search ..... 58/2, 19 R, 19 A, 19 B, 58/19 C, 20, 22; 200/35 R, 35 A, 38 R, 38 FA, 38 FB, 39 R, 39 A, 38 A

[56] References Cited

UNITED STATES PATENTS

| | | | |
|---|---|---|---|
| 2,325,812 | 8/1943 | Thompson | 200/39 A |
| 2,505,573 | 4/1950 | Prophet | 200/38 FA |
| 2,768,332 | 10/1956 | Protzmann et al. | 58/20 X |
| 3,407,402 | 10/1968 | Morrison et al. | 58/19 R X |
| 3,432,625 | 3/1969 | Polonsky et al. | 200/35 A |
| 3,475,899 | 11/1969 | Boyles | 200/38 FB X |
| 3,721,087 | 3/1973 | Boyles et al. | 58/2 X |

*Primary Examiner*—James R. Scott
*Attorney, Agent, or Firm*—Leonard J. Platt; George R. Powers; John F. Cullen

[57] ABSTRACT

An alarm clock timer mechanism having a pair of coaxially mounted gear driven cam members with one of the cam members being axially movable to actuate an alarm or other form of control mechanism at a preset alarm time. One of the cam members is provided with a resiliently mounted cam follower which moves axially toward the other cam member at the alarm time. The resilient mounting allows the follower to ride smoothly on a lower surface of the other cam after the alarm time, thus precluding any high torque resetting loads on a timing motor. A manually operable reset mechanism is provided for axially moving the cam members away from each other to move the control mechanism to its off position and to simultaneously reset the resiliently mounted cam follower on an upper surface of the other cam.

6 Claims, 11 Drawing Figures

200
36
30
52
248
38
32
54
40
34
56
246
224
219
252
226
236
240
238
212
258
222
214
220
218
262
261
260
254
46
72
256
264
216
48
72
50
72

ALARM CLOCK TIMER WITH MANUALLY OPERABLE RESET MECHANISM

Matter enclosed in heavy brackets [ ] appears in the original patent but forms no part of this reissue specification; matter printed in italics indicates the additions made by reissue.

BACKGROUND OF THE INVENTION

*This is a reissue application of our U.S. Pat. No. 3,740,502, issued June 19, 1973, filed Apr. 7, 1972, Application Ser. No. 241,963, assigned to the same assignee as the present application.*

This invention relates to an alarm clock timer, and more particularly to a cam mechanism for actuating a control mechanism such as an alarm vibrator or a switch at a preset time to sound an alarm or turn on a radio.

In devices of this type it has been a common practice to provide a pair of coaxially mounted gear driven cam members with one of the members being axially movable to actuate an alarm or other form of control mechanism. One of the cam members is driven by a timing motor and the other is adjustable so that the position at which the axial actuating movement occurs can be preset. In a mechanism of this type some means such as a spring is provided for urging the axially movable cam member into engagement with the mating cam member in order to insure that the axial actuating movement takes place. As shown in a prior U.S. Pat. No. 3,598,937 to Balchunas dated Aug. 10, 1971, assigned to the same assignee as the present invention, this has been accomplished by a resilient switch blade which normally urges switch contacts to a closed position and also urges an axially movable cam member into engagement with the mating cam member.

As shown in a prior U.S. Pat. No. 2,768,332 to Protzmann et al. dated Oct. 23, 1956, a resilient vibrator arm of an alarm clock has also been utilized for urging an axially movable cam member into mating engagement with its cooperating cam member.

In conventional alarm time gear and alarm set cam gear mechanisms such as the one disclosed and illustrated in a prior U.S. Pat. No. 2,702,450 to Gummersall dated Feb. 22, 1955, a spring 30 is provided for moving a cam gear member 22 axially toward cam gear member 24. At a preset alarm time a cam follower 38 of gear 24 moves into a complemental slot 40 in gear 22, and spring 30 axially moves cam gear 22 toward cam gear 24. A timing motor continuously rotates a gear 22 and rotation of the gear slowly moves the cam finger 38 on the edges of the slot 40 to gradually separate the cam gear members 22 and 24 to thereby slowly reset the cams. It can be appreciated that higher torque loads are applied to the timing motor during such a resetting movement than would normally be applied to the motor for simply rotating the hands of the clock.

In our co-pending application, Ser. No. 196,479, filed Nov. 8, 1971, *now U.S. Pat. No. 3,721,087,* and assigned to the same assignee as the present invention, there is disclosed a digital clock, and more particularly, a mechanism for driving the minutes, tens of minutes, hours and tens of hours display indicators for a digital clock. Such a mechanism requires a higher torque motor than would be required for merely driving the hands of a clock, and thus with the addition of a radio alarm mechanism to such a digital clock it becomes particularly desirable to provide a radio alarm mechanism which does not appreciably add to the torque requirements of the motor.

This invention is concerned with an improved cam gear mechanism for a radio alarm clock or other alarm clock which has very low torque requirements. It is also an object of our invention to provide a cam mechanism which may be readily combined with a digital clock of the type disclosed in the above-mentioned co-pending application.

SUMMARY OF THE INVENTION

In accordance with one of the aspects of this invention an alarm clock timer includes a supporting structure and a timing mechanism for continuously applying a driving force to components of an alarm mechanism. The alarm mechanism includes a first cam member which is rotatably mounted on the supporting structure and a second cam member also rotatably mounted on the supporting structure. The cam members are in coaxial relationship with each other and are axially movable with respect to each other. One of the cam members is continuously rotated by the timing mechanism and means is provided for manually adjusting the relative angular position of the cam members with respect to each other. An on-off control mechanism has a resilient member for exerting a spring force to urge the cam members axially toward each other and the same resilient member of the control mechanism also urges the control mechanism to its on position.

One of the cam members includes a cam follower for cooperating with [raised and lower cam surfaces] *a generally flat raised surface, a generally flat lower surface, and a curved surface with a notch which are formed on one side* of the other cam member. When the cam follower drops to a lower cam surface of the other cam member the resilient member moves the cam members toward each other to thereby permit the control mechanism to be moved to its on position. Our unique cam follower is not fixed to the cam member on which it is mounted, but is movable thereon so that when it drops to the lower cam surface of the other cam member it remains on the lower cam surface, and the timing mechanism simply rotates the cam members with respect to each other under substantially the same torque load that prevailed while the cam follower was positioned on the upper surface of the other cam member. Thus, the timing mechanism is not required to reset the cam follower by moving it from a lower surface of the other cam member to a higher cam surface of the other cam member against the force of the resilient member. Accordingly, our improved alarm mechanism may be readily operated with a relatively low torque motor.

In order to reset the alarm mechanism a manually operable control shut-off mechanism is provided for moving the second cam member axially away from the first cam member. During this movement, the control mechanism is moved to its off position against the spring force of the resilient member, and in addition, the cam follower is moved from a lower cam surface of the other cam member to a higher cam surface of the other cam member to reset the cams.

With this unique construction, a twelve hour alarm mechanism may be readily added to the digital clock timer disclosed in our co-pending application, Ser. No. 196,479, *now U.S. Pat. No. 3,721,087,* without substantially increasing the torque requirements of the motor. Moreover, relatively few additional parts are required to achieve this low torque alarm mechanism. Principally, it is merely necessary to provide a movable rather than a fixed cam follower on one of the twelve hour cam gears. A slot in the cam gear and a flexible leaf spring is all that is required for holding the cam follower on the gear.

BRIEF DESCRIPTION OF THE DRAWING

Other objects and attendant advantages of the invention will be apparent from the following description taken in connection with the accompanying drawing in which.

DESCRIPTION OF THE PREFERRED EMBODIMENT

Figure 1:
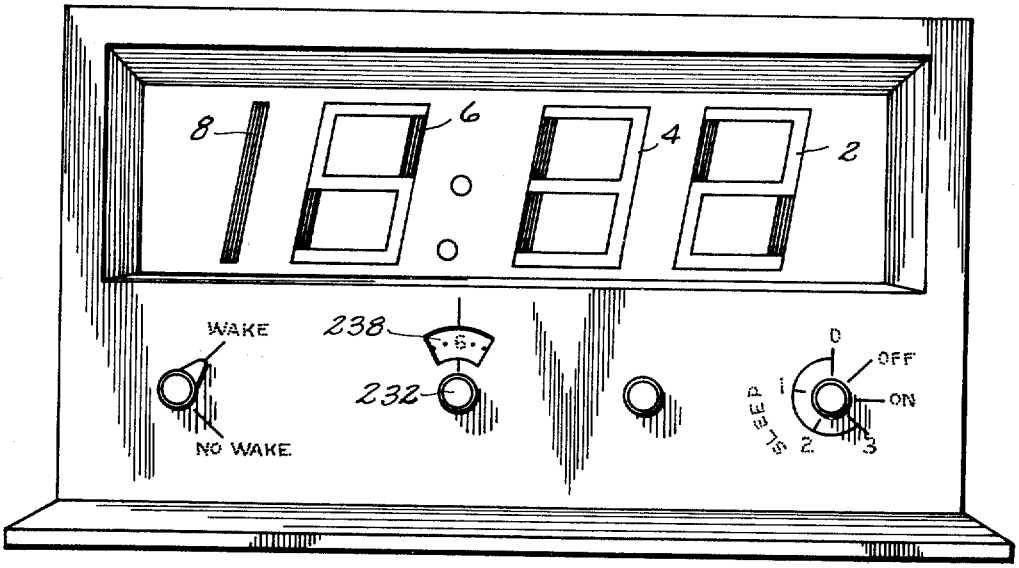
FIG. 1 is a front elevational view of a digital alarm clock timer constructed in accordance with our invention.
Figure 3:
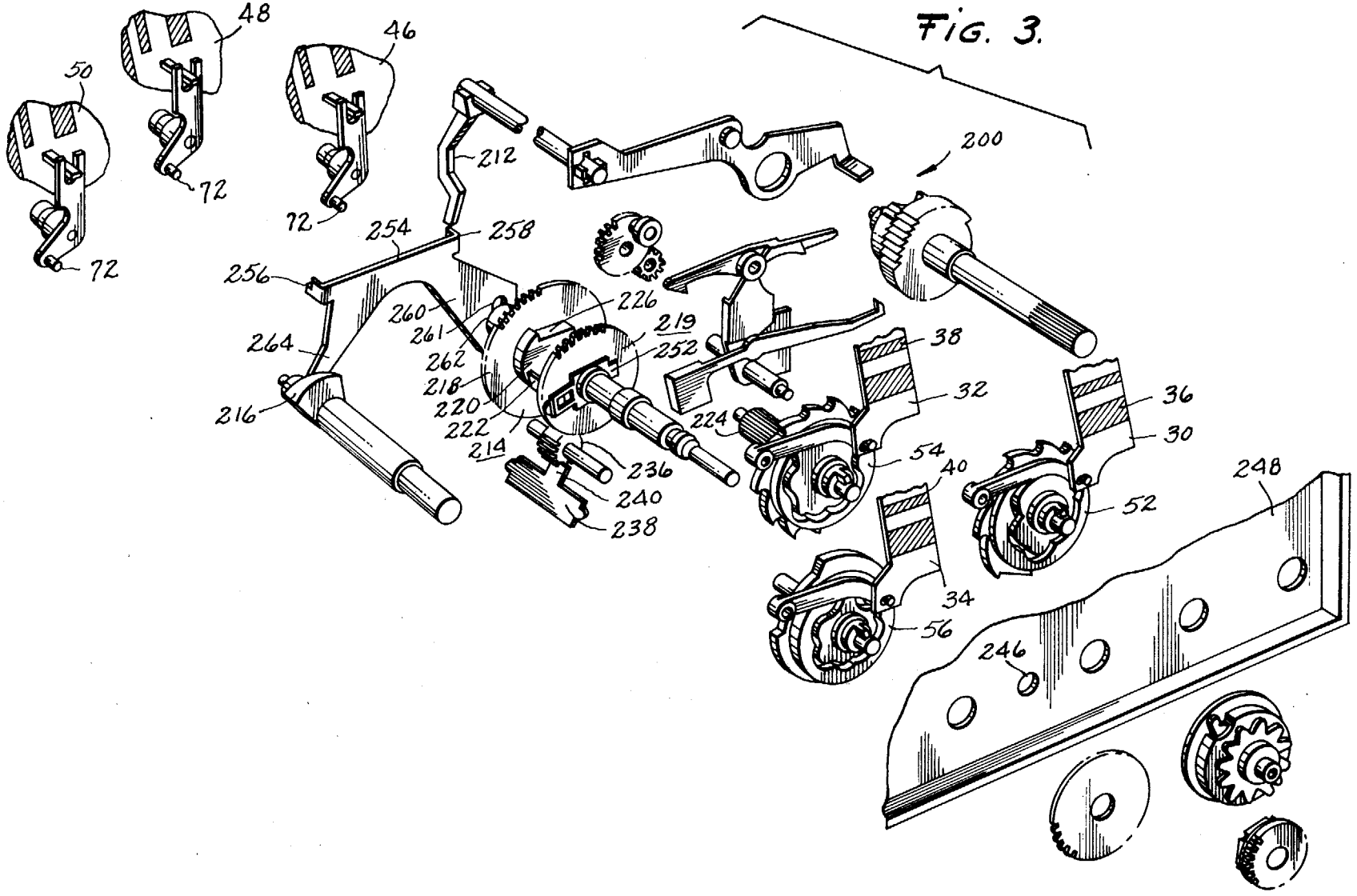
FIG. 3 is a fragmentary exploded front perspective view of a digital alarm clock which includes our unique alarm cam mechanism, portions of the display indicators for the clock are shown in this figure.

Referring now to the drawing and first particularly to FIGS. 1 and 3, there is shown a digital clock which includes our unique alarm mechanism. The clock includes four numeral display indicators 2, 4, 6 and 8 which indicate minutes, tens of minutes, hours and tens of hours, respectively. As shown in FIG. 3, portions of the display indicators are identified by reference numerals 30, 32, 34, 46, 48 and 50, portions of the cams and other mechanism for driving the display indicators are shown by reference numerals 52, 54, 56, 74 and 72, and a switch actuating and control mechanism for the clock is generally identified by reference numeral 200.

The details of the digital display indicators 2, 4, 6 and 8 and the details of the mechanism for indexing and driving the minutes, tens of minutes, and hours cams do not form a part of this invention and are described and illustrated in greater detail in our co-pending application, Ser. No. 196,479, filed Nov. 8, 1971, *now U.S. Pat. No. 3,721,087* and a co-pending application of Robert L. Boyles, Ser. No. 105,854, filed Jan. 12, 1971, now U.S. Pat. No. 3,683,523, issued Aug. 15, 1972, both assigned to the same assignee as the present invention.

Figure 2:
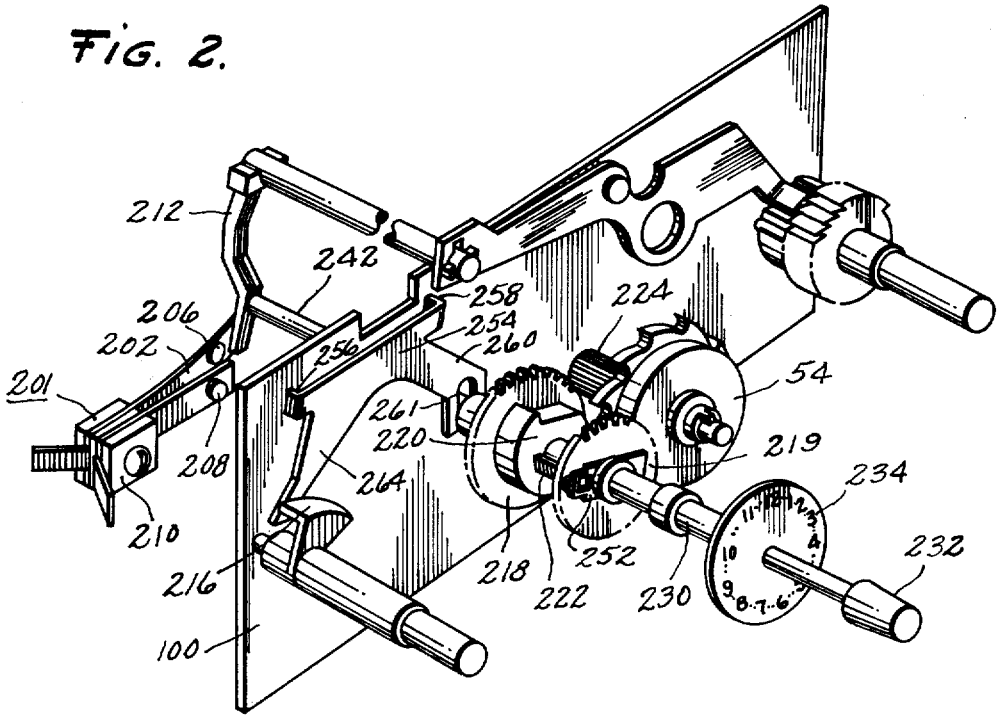
FIG. 2 is a fragmentary exploded front perspective view of a portion of the alarm clock timer illustrated in FIG. 1 illustrating our unique alarm time and alarm set cam mechanism and other portions of the clock, the parts being shown in a position wherein an alarm shut-off cam has moved the switch to an OPEN position to shut-off the alarm.

With reference to FIG. 2, the overall construction of the switch and alarm mechanism for the digital clock which includes a switch 201, switch actuating levers 212 and 268, and our unique alarm time cam mechanism 214 is described and illustrated in greater detail in our co-pending application, Ser. No. 241,965, filed Apr. 7, 1972 [.] , *now U.S. Pat. No. 3,725,617.*

The switch 201 includes a pair of switch blades 202 and 204 having a pair of switch contacts 206 and 208 mounted at their free end portions. Rear switch blade 202 is somewhat longer than the front switch blade 204 and is formed of spring material for normally biasing the rear switch blade forwardly to hold the switch contacts in a closed position. The switch blades may be mounted on a conventional switch block member 210 which may be connected to a rear plate 100 of the digital clock by any suitable securing means. As shown, the switch is mounted so that the switch blades 202 and 204 are arranged in planes which are generally parallel to the base plate 100. With this arrangement, rearward of transverse movement of the free end portion of the switch blade 202 will open the switch contacts.

An elongated switch actuating lever 212 is positioned between the rear switch blade 202 and the base plate 100 for opening or closing the switch in response to movement of our unique alarm time cam mechanism 214, a SLEEP, ON or OFF cam mechanism 215 or an alarm shut-off cam mechanism 216. It can be appreciated that rearward transverse movement of the elongated switch actuating lever 212 will cause the lower end portion 217 of the lever to abut the front surface of switch blade 202 and further rearward movement of the lever will cause the switch blade 202 to be moved far enough rearwardly to open the switch contacts 206 and 208, as shown more particularly in FIG. 2.

ALARM CAM MECHANISM

The alarm cam mechanism for allowing the elongated switch actuating lever 212 to be moved transversely forwardly at a preset alarm time to close the switch contacts 206 and 208 to thereby turn on a radio or other alarm at a preset time will now be more particularly described. Basically, the alarm cam mechanism includes two coaxially mounted gears 218 and 219 which are provided with interacting cams 220 and 222, respectively, for causing relative axial movement of the gears at a preset alarm time for actuating the switch 206 and 208.

The cam gears 218 and 219 are uniquely designed and combined with the digital clock mechanism thus far described. As shown more particularly in FIG. 2 cam gear 218 functions as an alarm time cam and is driven at one revolution every twelve hours by a pinion gear 224 which may be integrally formed with a tens of minutes cam gear 54. Thus, the alarm time cam gear 218 is provided with a sufficient number of teeth on its outer periphery to achieve a suitable gear reduction from the tens of minutes pinion 224 so that the alarm time cam gear 218 will be driven at one revolution every 12 hours.

An alarm cam 220 is fixed to its gear 218 and their common shaft 242 in any suitable manner. As shown in FIG. 2, the cam 220 is generally circular in shape with a cutout or notch 226 which forms the alarm time operable portion. The alarm set cam gear 219 is fixed to a shaft 230 which extends forwardly and rearwardly therefrom, and a knob 232 may be fixed to the forward end of shaft 230 for manually rotating the alarm set cam 222 to any desired alarm time.

Figure 4:
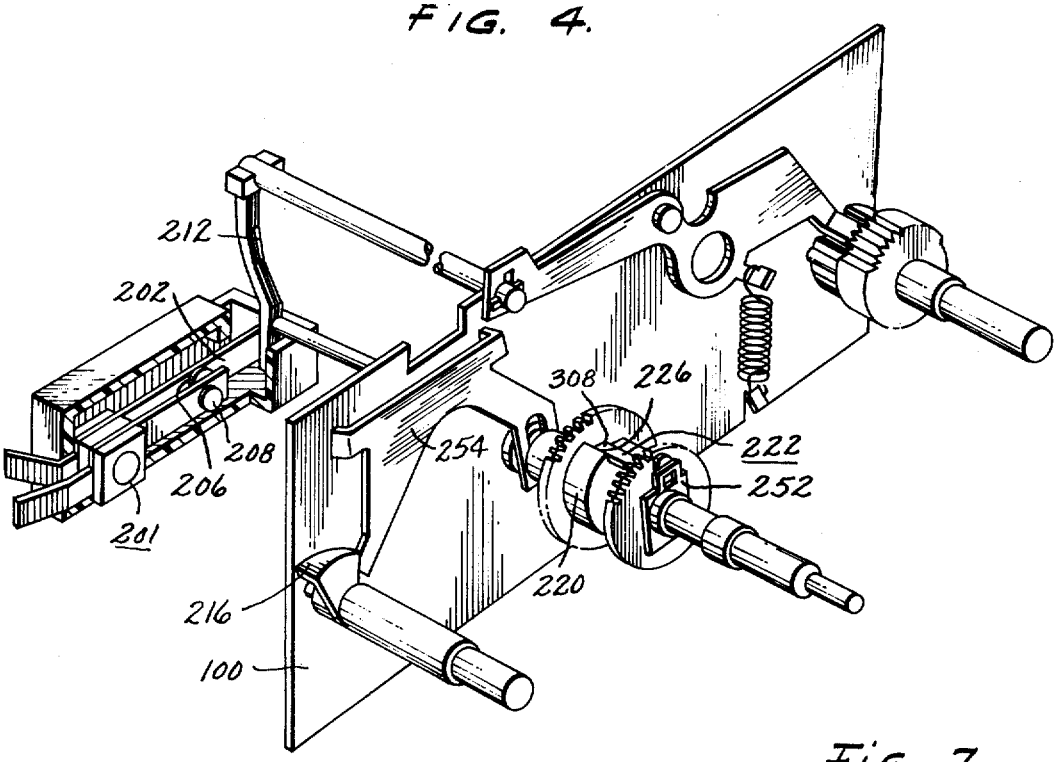
FIG. 4 is a fragmentary exploded front perspective view generally similar to FIG. 2 showing the parts under the control of an alarm time cam wherein the alarm time cam has functioned to close the switch at the alarm time.
Figure 5:
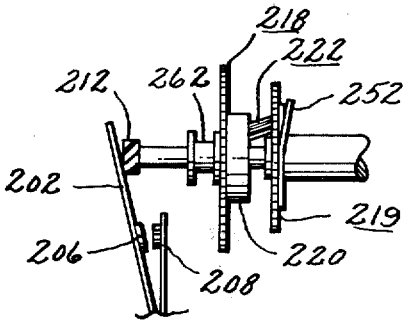
FIG. 5 is a detail side elevational view of the alarm time cam, alarm set cam, switch actuating lever, and switch in the position illustrated in FIG. 2.
Figure 6:
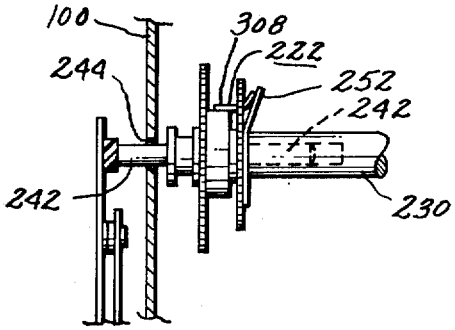
FIG. 6 is a detail side elevational view of the alarm time cam, alarm set cam, switch actuating lever, and switch, the parts being shown in their positions after the switch has been closed and the timing motor has rotated the alarm time cam without resetting the cam finger on top of the alarm time cam.

As shown more particularly in FIGS. 4, 5 and 6, the alarm time cam 218, 220 and the alarm set cam 219, 222 are supported in coaxial relationship with respect to each other on the digital alarm clock by providing shaft 242 of the alarm time cam with a relatively small diameter so that it extends into a hollow end portion of shaft 230 of the alarm set cam. As shown more particularly in FIGS. 5 and 6, the shaft 242 extends rearwardly through an aperture 244 which is formed in the mounting plate 100, and as shown in FIG. 3 the shaft 230 extends forwardly through an aperture 246 which is formed in a front plate 248 for supporting the alarm time cam and the alarm set cam on the digital clock.

A relatively simple and reliable alarm time indicator is incorporated with the alarm set cam for indicating the desired alarm time. As shown in FIGS. 1 and 2, the principal component of the indicating mechanism is a disk 234 which may be readily snapped on an outer portion of the shaft 230 for cooperation with a suitable slot 238 which may be formed in the front casing of the digital clock for viewing the hour numerals which are formed on the indicating disk 234. Accordingly, with this construction a user of the digital clock may readily set a desired alarm time by simply rotating the manual knob 232, and such rotation will cause corresponding movement of the alarm set cam gear 219, cam finger 222 and the disk 234.

With our alarm cam mechanism 218, 220, 219 and 222, it can be appreciated that relatively few parts are required for actuating the switch 206, 208 at a preset alarm time. The inherent resiliency of the switch blade 202 is all that is necessary for constantly urging the switch actuating lever 212 forwardly which in turn urges the shaft 242 and, hence, the alarm time cam 218 forwardly into contact with the alarm set cam 219.

In operation, if it is desired to have the alarm ring at 6 o'clock in the morning, the operator rotates knob 232 and, hence, the alarm time indicating disk 234 and the alarm set cam 219 to the appropriate 6 o'clock position as indicated in FIG. 1. The spring force of the swtich blade 202 urges the front face of cam 220 into contact with the cam follower finger 222 on the alarm set cam 219, and thus, the forward cam surface of cam finger 222 will ride on the forward face of cam 220 as the cam 220 is incrementally rotated by the gear 218 and pinion 224 of the tens of minutes cam.

Figure 7:
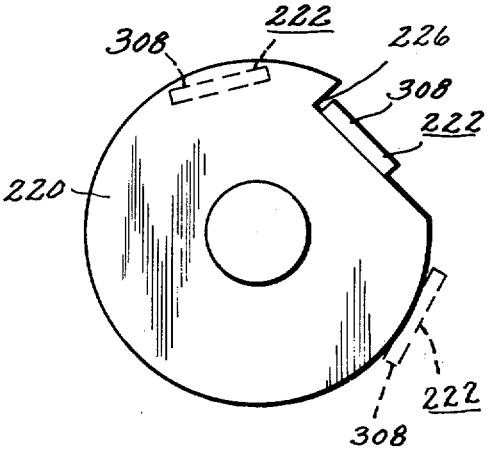
FIG. 7 is a fragmentary front elevational view of the alarm time cam and a finger portion of the alarm set cam, the cam finger of the alarm set cam being shown in three different operative positions on the alarm time cam.

At 6 o'clock in the morning the cam finger 222 will become aligned with the cam notch 226 which is formed in cam 220 and the switch blade 202 will rapidly force the continuously rotated gear 218 axially toward the gear 222 as the finger 222 moves into the cam notch 226 at the alarm time, as shown in FIGS. 4 and 7. Naturally, during this movement the switch blade 202 will also move forwardly to close switch contacts 206, 208.

In the more conventional alarm time cam and alarm set cam gear arrangements, such as the one disclosed in a prior U.S. Pat. No. 3,432,625 to Polonsky, dated Mar. 11, 1969, assigned to the same assignee as the present invention, a cam finger is fixed to a rotatable alarm set gear for cooperating with a slot which is formed in a continuously rotatable alarm time cam gear. With the arrangement shown in the Polonsky patent a cam finger 24 snaps into a cam slot 30 at an alarm time, and then the cam finger 24 drives out and separates the cam gears in about 45 to 90 minutes. Naturally, such a drive-out movement would require a higher torque motor than would normally be required for simply rotating the hands of a clock.

MOVABLE CAM FOLLOWER AND MANUAL RESET MECHANISM

Figure 9:
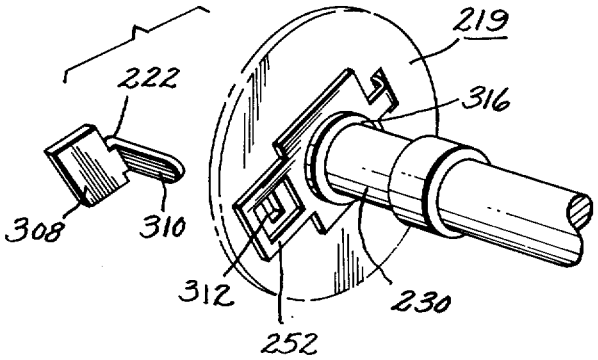
FIG. 9 is a fragmentary exploded front perspective view of a portion of our unique alarm set cam.

In order to keep the torque requirements of the motor as low as possible, we have provided cam gear 219 with a unique movable cam follower 222 which may remain on a lower cam surface of cam 218 after the cam gear 218 has been moved axially toward gear 219 at the alarm time. As shown more particularly in FIGS. 9 and 10, the cam follower 222 may be formed from a piece of sheet metal. The follower includes an enlarged finger portion 308 which is arranged in slidable engagement with the surfaces of the alarm time cam 220, and a reduced holding portion 310 for retaining the follower 222 on its alarm set gear 219. As shown, the retaining portion 310 is arranged at an angle of about 120° to the finger 308 and it is inserted within a slot 312 which is formed in the gear 219.

Figure 11:
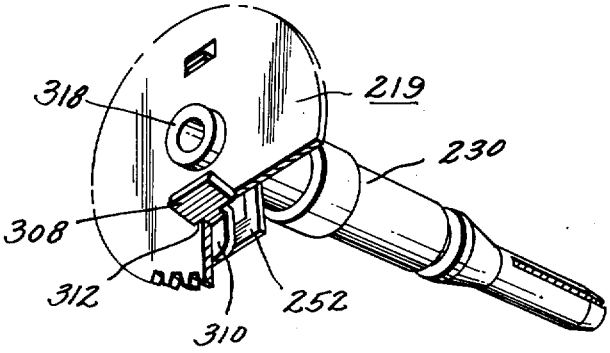
FIG. 11 is a fragmentary perspective view thereof with portions cut away to show details of construction.
Figure 10:
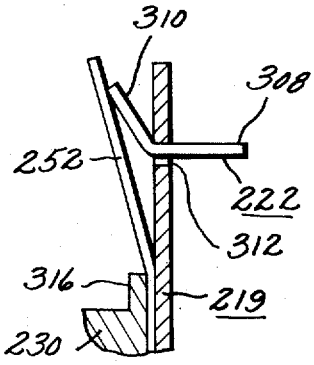
FIG. 10 is a fragmentary cross-sectional view thereof.

An extremely simple and reliable mechanism is provided for resiliently holding the cam follower 222 on gear 219. As shown more particularly in FIG. 9, a flexible leaf spring 252 is held to a forward surface of the cam gear 219 by being sandwiched between a flange portion 316 of shaft 230 and the forward surface of gear 219. With particular reference to FIG. 11, it can be appreciated that the end of shaft 230 may be readily peened over at 318 to hold the gear 219 and the flexible leaf spring to the shaft 230. In order to connect the cam follower 222 to its gear 219 it is merely necessary to insert its holding finger 310 within slot 312 as shown in FIG. 10 and then release the finger. With particular reference to FIG. 11 it can be appreciated that the resilient force of leaf spring 252 will hold finger 310 against the front surface of gear 219 and the cam follower 308 will be positioned at a somewhat less than a 90° angle with respect to the rear surface of gear 219. With this construction it can be readily understood that as gear 218 is rotated by the timing motor the rearmost surface of cam follower 308 will ride on the surface of cam 220.

Figure 8:
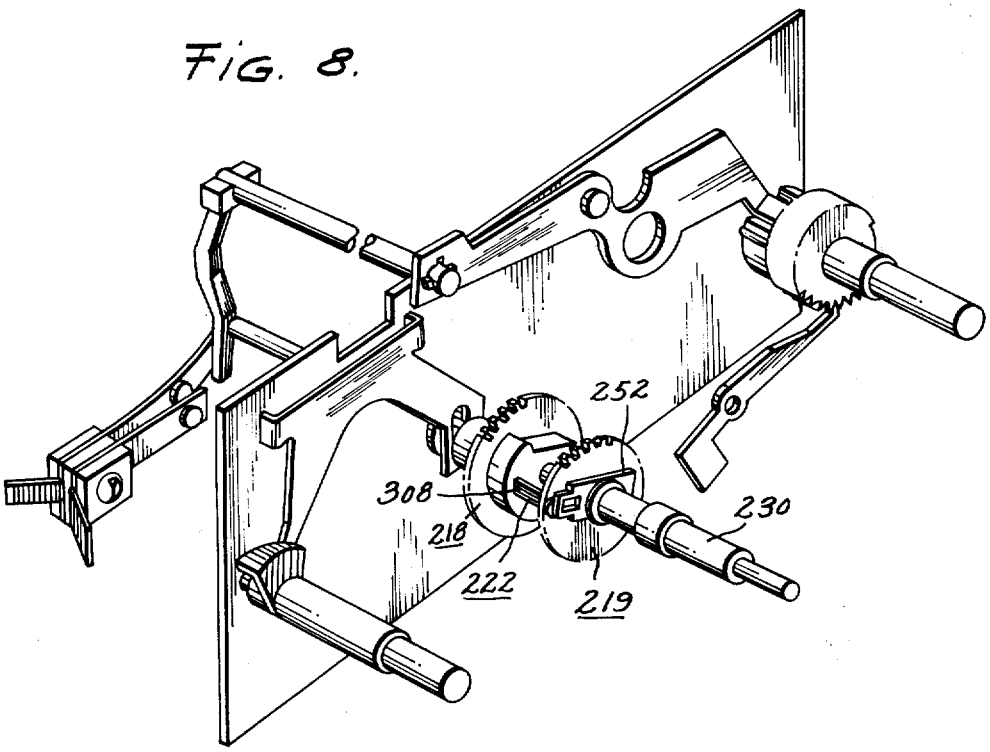
FIG. 8 is a fragmentary exploded front perspective view similar to FIG. 2 showing the parts under the control of the alarm time cam with the alarm cam and cam finger in a position to hold the switch in an OPEN position.

In the position illustrated in FIGS. 8 and 5, the parts are under the control of the alarm time and alarm set cams 218 and 219, respectively, with the alarm set cam 219 and its follower 220 in a position to hold the switch 206, 208 in its OPEN position. In this position, the cam follower finger 308 is located on the upper forward surface of cam 220 and it slides on the forward surface as the cam 220 is incrementally rotated by the timing motor. This position of the cam finger 308 is also illustrated in dotted lines at the upper portion of FIG. 7.

With particular reference to FIGS. 4 and 7, it can be appreciated that the cam finger 308 drops into the notch 226 of the alarm time cam at the alarm time to permit cam 220 and gear 218 to move axially forward toward gear 219. This movement is caused by the resilient force of switch blade 202, and naturally, it can be appreciated that the switch contacts 206, 208 will be closed during this forward movement of cam 220. After the switch actuating movement takes place and the gear 220 continues to be rotated by the timing motor the rear surface of cam finger 308 slides on the inner or lower surface of the cam gear 218, 220, as shown in FIG. 4 and the solid line and lower dotted line positions of finger 308 in FIG. 7.

Our cam follower finger 308 is uniquely arranged so that the timing motor is not required to reset the finger 308 from the lower surface of cam 220 to the upper surface of cam 220. Accordingly, as the cam 220 is rotated by the timing motor the finger 308 merely slides on the lower surface of the cam 220 from its solid line position illustrated in FIG. 7 to its dotted line position illustrated in the lower portion of FIG. 7. With particular reference to FIGS. 6 and 7, it can be appreciated that during this movement the end portion of the cam finger 308 is moved radially outwardly from its solid line to its lower dotted line position illustrated in FIG. 7. During this movement a very slight force is exerted on the leaf spring 252 and the finger 308 is positioned almost perpendicular to the surface of gear 219, as shown in FIG. 7.

In addition, during this portion of the cycle of operation the lower inner portion of the finger 308 rides on the lower or inner surface of cam 220 and the radially inner portion of the finger 308 rides on the outer periphery of cam 220 as shown by its lower dotted line position in FIGS. 7 and 6.

A WAKE-NO WAKE alarm shut-off cam lever mechanism 216, 254 is provided for moving the alarm time cam gear 218, 220 rearwardly to position the finger 222 on the front surface of cam 220. As shown more particularly in FIG. 4, the mechanism includes a bifurcated lever 254 which is pivoted by tabs 256 and 258 to the mounting plate 100 of our digital clock. One downwardly extending arm 260 of the lever includes a U-shaped slot 261 for receiving an annular groove 262 which is formed on the shaft portion 242 of the alarm time cam. With this construction, the lever 254 is loosely held to the alarm time cam gear 218. The other left arm 264 of the lever 254 extends downwardly into a position to be actuated by the WAKE-NO WAKE cam 216.

With the use of the manual reset cam mechanism 216, 254 after the switch 206, 208 has been moved to its closed position as shown in FIG. 4, at 6 o'clock in the morning in the above-mentioned example, and it is desired to turn off the radio or alarm, the radio or alarm switch 206, 208 may be readily moved to the open position illustrated in FIG. 3 by rotating the WAKE-NO WAKE cam 216 clockwise from the position illustrated in FIG. 4 to the position illustrated in FIG. 2. During this movement, the cam 216 moves arm 264 toward the base plate 100 to thereby simultaneously move arm 260 and the alarm time cam 218 including its shaft 242 rearwardly to open switch contacts 206, 208. This movement for opening the switch also simultaneously manually resets the cam finger 308 on top of the front surface of cam 220. It can be appreciated that as the cam 220 is moved rearwardly the finger 222 slides forwardly on the outer periphery of the cam surface 220 until it reaches the front surface of the cam and at that instant the leaf spring 252 flips the finger 308 from its lower dotted line position illustrated in FIG. 7 to its radially inner dotted line position illustrated at the upper portion of FIG. 7 and in FIG. 5.

From the foregoing description, it can be appreciated that the manually operable control shut-off mechanism 216, 254 is provided for moving the cam member 220 away from the cam member 219, 222 in order to manually move the cam follower 308 from a lower surface of cam 220 illustrated in FIG. 4 to an upper surface of cam 220 as illustrated in FIGS. 2 and 5. Thus, after the timing motor has moved the cam parts to the radio ON alarm sounding position illustrated in FIG. 4 the timing motor is not required to reset the cam finger 308 on top of cam 220 and the finger merely slides on the lower surface of the cam. Naturally, since the timing motor is not required to reset the cam follower, our unique cam mechanism does not appreciably add to the torque requirements of the motor.

In accordance with our invention, a very significant advantage is achieved with the use of our unique movably mounted cam follower 222 and the manually operated WAKE-NO WAKE alarm shut-off cam lever mechanism 216 when the alarm mechanism is utilized for actuating a switch. If a conventional cam gear arrangement such as the one disclosed in the aforementioned prior U.S. Pat. No. 3,432,625 to Polonsky were used for operating a low cost switch such as the switch 206, 208 illustrated in FIG. 2, the contacts would be opened very slowly as the cam gears were being separated by the timing motor. This action would probably draw an arc for an appreciable period of time and would erode or perhaps weld the contacts to each other. In addition, such an arrangement could cause electrical interference. With our unique arrangement, the contacts are opened manually by using the manually operable WAKE-NO WAKE cam 216. This opening occurs reasonably rapidly and thus, the arcing problem is minimized. The initial closure of the switch occurs rapidly when the cam finger 222 drops into notch 226. Thus, the speed of closure is no problem. Without our unique movably mounted cam follower 222 and the manually operated WAKE-NO WAKE shut-off mechanism 216 a more expensive snap action switch would probably be utilized thereby increasing the number of parts.

From the foregoing discussion it will also be appreciated that our unique cam mechanism may be readily formed and added to an alarm clock timer with relatively few additional parts. It is merely necessary to provide a movable rather than a fixed cam follower on one of the twelve hour cam gears, and a slot in the cam gear and a flexible leaf spring is all that is required for holding the cam follower 220 on the gear.

What we claim is:

1. In an alarm clock mechanism the improvement comprising:

a. a timing mechanism;

b. a supporting structure;

c. a first cam member rotatably mounted on said supporting structure;

d. a second cam member rotatably mounted on said supporting structure in coaxial relationship with said first cam member and axially movable with respect thereto, *said second cam member having a*

*longitudinal axis and being mounted for rotation about said axis, said second cam member having a first side facing generally toward said first cam member and another side facing generally away from said first cam member, said first side including a generally flat raised surface, a generally flat lower surface longitudinally spaced from said raised surface away from said first cam member, and a generally curved surface with a radially indented portion positioned between said lower surface and said raised surface;* e. one of said cam members being caused to rotate by said timing mechanism;

f. means for manually adjusting the relative angular position of said cam members;

g. an on-off control mechanism having a resilient member exerting a spring force urging said second cam member axially toward said first cam member;

h. said second cam member being disposed to move axially under the influence of said spring force to permit said control mechanism to be moved to its on position upon relative rotation of said cam members through a predetermined relative angular position;

i. [ one of said cam members] *said first cam member* including a cam follower [which is] rotatable with said [one of said cam members] *first cam member* for cooperation with *said* [raised and lower cam] surfaces of [the other] *said second* cam member to permit said resilient member to move said second cam member toward said first cam member to permit the control mechanism to be moved to its on position; and j. said cam follower being mounted for movement with respect to the [cam member on which it is supported] *first cam member* for permitting said cam follower to remain on the [ lower cam surface of said other cam member] *curved surface of said second cam member* so that said timing mechanism is not required to move said cam follower from a lower cam surface on said [other] *second* cam member to a higher cam surface of said [other] *second* cam member against the force of said resilient member.

2. An alarm clock timer mechanism as defined in claim 1 wherein a manually operable control shut-off mechanism is provided for moving the second cam member axially away from the first cam member to move the control mechanism to its off position and to permit said cam follower to be moved from a lower cam surface of the [other] *second* cam member to a higher cam surface of the [other] *second* cam member.

3. An alarm clock timer mechanism as defined in claim 1 wherein said cam follower includes a cam finger which is inserted within a slot formed in the *first* cam member on which it is mounted and is arranged for pivotal movement within the slot.

4. An alarm clock timer mechanism as defined in claim 3 wherein a leaf spring is fixed to [one of the cam members] *the first cam member* for resiliently [olding] *holding* the cam finger.

5. An alarm clock timer as defined in claim 4 wherein a manually operable control shut-off mechanism is provided for moving the second cam member axially away from the first cam member to move the control mechanism to its off position and to permit said cam follower to be moved from a lower cam surface [to] *of* the [other] *second* cam member to a higher surface of the [other] *second* cam member under the resilient force of said resilient member.

6. An alarm clock timer mechanism as defined in claim 2 wherein the resilient member [is] *of* said on-off control mechanism is a resilient switch blade having a contact formed thereon which is normally biased toward a fixed switch contact, and said manually operable control shut-off mechanism rapidly moves said switch blade and its contact away from the fixed contact when the [cam members are moved axially away from each other] *second cam member is moved axially away from the first cam member* thereby minimizing arcing between the switch contacts.

* * * * *